US008782001B2

(12) United States Patent
Burke et al.

(10) Patent No.: US 8,782,001 B2
(45) Date of Patent: Jul. 15, 2014

(54) COMPUTATION OF IMPACTED AND AFFECTED CODE DUE TO DATABASE SCHEMA CHANGES

(75) Inventors: Michael G. Burke, Yorktown Heights, NY (US); Rosalva E. Gallardo Valencia, Irvine, CA (US); Igor Peshansky, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 12/958,893

(22) Filed: Dec. 2, 2010

(65) Prior Publication Data

US 2011/0208785 A1  Aug. 25, 2011

Related U.S. Application Data

(60) Provisional application No. 61/306,361, filed on Feb. 19, 2010.

(51) Int. Cl.
*G06F 7/00* (2006.01)

(52) U.S. Cl.
USPC .......................................... 707/610; 707/803

(58) Field of Classification Search
USPC ......... 707/601, 760, 803, 806–809, 758, 786, 707/800, 694, 795, 814, 610; 705/7.37
See application file for complete search history.

(56) References Cited

U.S. PATENT DOCUMENTS

| | | | |
|---|---|---|---|
| 2002/0118954 A1* | 8/2002 | Barton et al. | 386/83 |
| 2006/0143047 A1* | 6/2006 | Briegs et al. | 705/2 |
| 2009/0307650 A1* | 12/2009 | Saraf et al. | 717/101 |
| 2010/0114962 A1 | 5/2010 | Ahadian et al. | |
| 2010/0313179 A1* | 12/2010 | Groves et al. | 717/101 |

OTHER PUBLICATIONS

Fink et al., "Semi-Automatic J2EE Transaction Configuration", RC23326 (W0403-130) Mar. 22, 2004 Computer Science, pp. 1-19.
Maule et al., Impact Analysis of Database Schema Changes:, ICSE'08, May 10-18, 2008, Leipzig, Germany, pp. 1-10.
Deruelle et al., "A Change impact Analysis Approach for Corba Based Federated Database", [Online], 2000, pp. 949-958, [retrieved from Internet on Jun. 17, 2012], http://www.springerlink.com/content/f9kfrcmq04rvq24e/fulltext.pdf.
Daou et al., "Regression Testing of Database Applications", 2001, pp. 285-290, [retrieved from Internet on Jun. 17, 2012], http://web.cs.du.edu/~sazghand/background_chap_papers/Regression%20testing%20database%20application.pdf.

(Continued)

*Primary Examiner* — James Trujillo
*Assistant Examiner* — Linh Black
(74) *Attorney, Agent, or Firm* — Scully, Scott, Murphy & Presser, P.C.; Louis J. Percello, Esq.

(57) ABSTRACT

The disclosed technology enables assistance to software developers by identifying the software application code that needs to be changed or behaves differently, as a consequence of a database schema change. The disclosed technology also enables a provision of automatic transformations, or at least hints for the transformation of the code, to accommodate the database schema change.

22 Claims, 11 Drawing Sheets

(56) References Cited

OTHER PUBLICATIONS

Karahasanovic et al., "Visualizing impacts of database schema changes—A controlled experiment", Proceedings IEEE Symposia on Human-Centric Computing Languages and Environments (Cat. No. 01TH8587) pp. 358-365. Sep. 5-7, 2001, Stresa, Italy.

Karahasanovic et al., "Identifying impacts of Database Schema Changes on applications" Proceedings of the 8th Doctorial Consortium at the Caise '01, Jun. 4, 2001, pp. 1-12, XP002369522 Switzerland.

Lock, Simon et al., "Systematic change impact determination in complex object database schemata" ECOOP Workshop 1999: Proceedings of the workshop for PHD Students in OO Systems (PHDOOS'99), Jun. 14, 1999, pp. 1-10, XP002369519.

IBM DB2 Change Management Expert for Multiplatforms, User's Guide, Version 1, Release 1. See pp. 16-18, http://publib.boulder.ibm.com/infocenter/mptoolic/v1r0/topic/com.ibm.db2tools.chx.doc.ug/chxuga12.pdf?noframes=tru <retrieved on Aug. 26, 2008>.

\* cited by examiner

700

710

TABLE DEFINITION EXAMPLE

```
CREATE TABLE ACT (
      ACTNO SMALLINT NOT NULL,
      ACTKWD CHAR(6) NOT NULL,
      ACTDESC VARCHAR(20) NOT NULL,
)
```

DDL STATEMENT EXAMPLE: CHANGING A COLUMN FROM INTEGER TO VARCHAR

```
ALTER TABLE "SSURANGE"."ACT" ALTER COLUMN "ACTNO" SET DATA TYPE VARCHAR(5);
```

DDL STATEMENT EXAMPLE: CHANGING A COLUMN FROM INTEGER TO VARCHAR  720

ALTER TABLE "SSURANGE". "ACT" ALTER COLUMN "ACTINO" SET DATA TYPE VARCHAR(5);

```
import com.ibm.pdg.annotation.Table;
@Table (name = 'ACT", schema = "SSURANGE")
public class ActInLine (
    // Class variables
    @ Id
    public short actno;
    public String actkwd;
    public String actdesc;
    /**
     *Constructor for Act.
     */
    public ActInLine ( ) {
        super ( );
    )
    /**
        Constructor for Act that sets all fields,
     */
    public ActInLine (short actno, String actkwd, String actdesc) {
        super( );
        this . actno = actno;
        this . actkwd = actkwd;
        this . actdesc = actdesc;
```
810

Schemas
  SSURANGE
    ACT
      SELECT ACTNO, ACTKWD, ACTDESC FROM
        SSURANGE ACT WHERE ACTINO = ?
        ActInLineSample.main:51
        ACTNO
          ActSample Inline.main:36
          ActSample Inline.main:37
          ActSample Inline.main:38
          ActSample Inline.main:39
          ActSample Inline.main:42
          ActSample Inline.main:43
          ActSample Inline.main:44

DDL STATEMENT EXAMPLE: CHANGING A COLUMN FROM INTEGER TO VARCHAR    720

900

ALTER TABLE "SSURANGE". "ACT" ALTER COLUMN "ACTNO" SET DATA TYPE VARCHAR(5);

```
        SampleUtil.printin ("All required arguments were not provided.");
        return;
}
data = SampleUtil.getData (ActData.class,
        "jdbc:db2 : // localhost : 50000/SAMPLE", "db2admin", args[0];
((Data)data).setAutoCommit(false);
Iterator<Act> getActs = data.getActs( );

Act bean = null;
    if (getActs.hasNext ( ) ) {
        bean = getActs. next ( );
((Resultiterator<Act> )getActs) . close ( );
} else {
        SampleUtil.printin ("Result set is empty.");
        (( Data ) data.rollback ( );
        return;
}
getActs = data.getActs ( );
SampleUtil.printin ("Results for getActs ( )");
SampleUtil.printAll (getActs );

ActgetAct = null;
getAct = data.getAct (bean.getActno ( ) );
SampleUtil.printin ("Results for getAct (bean.getActno ( ) )");
SampleUtil.printClass (getAct);
data.updatAct (bean);
```
910

⊡ 🗁 Schemas
  ⊡ 🗁 SSURANGE
    ⊡ ☐ ACT
      ⊡ 🗎 SELECT ACTNO, ACTKWD, ACTDESC FROM
          SSURANGE ACT WHERE ACTNO = ?
        ⌁ ActInLineSample.main:51
        🗎 ACTNO
          ▣⌁ getActs : Line #51 : ActinLineSample.Java
          ▣⌁ bean : Line #55 : ActinLineSample.Java
          ▣⌁ getActs : Line #66 : ActinLineSample.Java
          ▣⌁ getActs : Line #70 : ActinLineSample.Java
          ▣⌁ bean : Line #77 : ActinLineSample.Java
920

FIG. 9

COMPUTATION OF IMPACTED AND AFFECTED CODE DUE TO DATABASE SCHEMA CHANGES

PRIORITY CLAIM

The present disclosure claims priority from U.S. Provisional Patent Application No. 61/306,361 filed on Feb. 19, 2010, for "PRECISE STATIC SLICING TECHNIQUES IN THE PRESENCE OF KNOWN API," the entire contents and disclosure of which, are expressly incorporated by reference herein as if fully set forth herein.

CROSS-REFERENCE TO RELATED APPLICATIONS

The present disclosure is generally related to the following commonly-owned, co-pending U.S. patent application Ser. No. 12/255,946 filed on Oct. 22, 2008, for "METHOD AND TOOLS FOR IDENTIFYING IMPACT OF DATABASE CHANGES ON AN APPLICATION," the entire contents and disclosure of which, are expressly incorporated by reference herein as if fully set forth herein.

TECHNICAL FIELD

The present disclosure relates generally to software application development and more particularly to software application development tools for computing an impact of a proposed database schema change on code of a software application.

BACKGROUND

Many software applications retrieve, manipulate and store information in databases. The architecture and function of these software applications, like other software systems, inevitably evolve due to changes in the business logic, performance optimization and other reasons.

Generally, a database schema defines a data structure of a database. Often, a database administrator (DBA) and/or a software developer apply a Data Definition Language (DDL) statement, such as a Structured Query Language (SQL) statement, that modifies the database schema. A change to the database schema can often cause the software application that utilizes the database to run inefficiently, cause runtime errors or fail, negatively impacting the operations of an organization. Therefore, in order to determine if a software application code modification is needed, it would be beneficial for the DBA and/or the software developer to understand the impact that the database schema change may have on the software application that accesses the database. However, there is currently a lack of adequate Integrated Development Environment (IDE) support to sufficiently determine this impact.

In view of the foregoing, it would be desirable to provide a technology to assist the DBA and/or the software developer in identifying the software application code that needs to be changed or behaves differently, as a consequence of the database schema change. It would also be desirable to provide a technology to provide automatic transformations, or at least hints for the transformation of the code, to accommodate the database schema change.

SUMMARY

Accordingly, a technology is disclosed that helps software developers improve their understanding of the code and their productivity during the development and maintenance of a software application that interacts with a database. Specifically, the disclosure includes static program analysis techniques for identifying the impact of database schema changes on software applications.

In one embodiment, the disclosed technology allows software developers to identify the object-oriented code that is affected and possibly even invalidated by a database schema change.

In one embodiment, the disclosed technology allows an IDE to provide hints on how to transform code in order to synchronize it with the current state of the database schema.

One embodiment is directed to a computer-implemented method for assessing an impact of a database schema change on a software application, the method comprising: analyzing code of the software application to identify a portion of the code which accesses a database object identified as being subject of a proposed database schema change; determining a first data set by processing the identified portion of the code using database object slicing for the database object affected by the proposed database schema change; determining a second data set by processing the first data set using a list which includes at least one API property of the code of the software application; applying a set of predetermined rules against the second data set in order to obtain a third data set comprising one or more of affected, impacted and invalidated code portions, each code portion having a reference to be accessible by; and sending the third data set to an analysis result recipient capable of allowing a user to access, via the reference, at least a portion of the third data set.

Another embodiment is directed to a computer program product for assessing an impact of a database schema change on a software application, the computer program product comprising: a storage medium readable by a processing circuit and storing instructions for execution by the processing circuit for performing a method comprising: analyzing code of the software application to identify a portion of the code which accesses a database object identified as being subject of a proposed database schema change; determining a first data set by processing the identified portion of the code using database object slicing for the database object affected by the proposed database schema change; determining a second data set by processing the first data set using a list which includes at least one API property of the code of the software application; applying a set of predetermined rules against the second data set in order to obtain a third data set comprising one or more of affected, impacted and invalidated code portions, each code portion having a reference to be accessible by; and sending the third data set to an analysis result recipient capable of allowing a user to access, via the reference, at least a portion of the third data set.

Yet another embodiment is directed to a computer system for assessing an impact of a database schema change on a software application, the system comprising: a memory; a processor in communications with the computer memory, wherein the computer system is capable of performing a method comprising: analyzing code of the software application to identify a portion of the code which accesses a database object identified as being subject of a proposed database schema change; determining a first data set by processing the identified portion of the code using database object slicing for the database object affected by the proposed database schema change; determining a second data set by processing the first data set using a list which includes at least one API property of the code of the software application; applying a set of predetermined rules against the second data set in order to obtain a third data set comprising one or more of affected, impacted and invalidated code portions, each code portion having a reference to be accessible by; and sending the third data set to an analysis result recipient capable of allowing a user to access, via the reference, at least a portion of the third data set.

BRIEF DESCRIPTION OF THE DRAWINGS

The objects, features and advantages of the disclosed technology will become apparent to one skilled in the art in view of the following detailed description taken in combination with the attached drawings, in which:

FIG. 7 symbolically shows examples of a table definition and DDL statements for changing a column of a database table, according to one embodiment of the disclosed technology;

FIG. 8 symbolically shows an exemplary Graphical User Interface (GUI) of an IDE that displays impact analysis results for a DDL statement, highlighting variables and methods of a Java® application that accesses an affected column of a database table, according to one embodiment of the disclosed technology;

FIG. 9 symbolically shows an exemplary GUI of an IDE that displays impact analysis results for a DDL statement, highlighting objects and locations of a Java® application that accesses an affected column of a database table, according to one embodiment of the disclosed technology;

DETAILED DESCRIPTION OF THE PREFERRED EMBODIMENTS

As used herein, code is any sort of specification of program execution which would be interpreted or from which actual machine instructions will be generated. Some examples of code include source code, bytecode, assembly language, microcode, object code, executable instructions and machine code. While, for simplicity and clarity, the following description of the figures is described in reference to source code, the disclosed technology is not limited to source code. Rather, the disclosed technology may be implemented and used with any sort of specification of program execution which would be interpreted or from which actual machine instructions will be generated.

Figure 1:
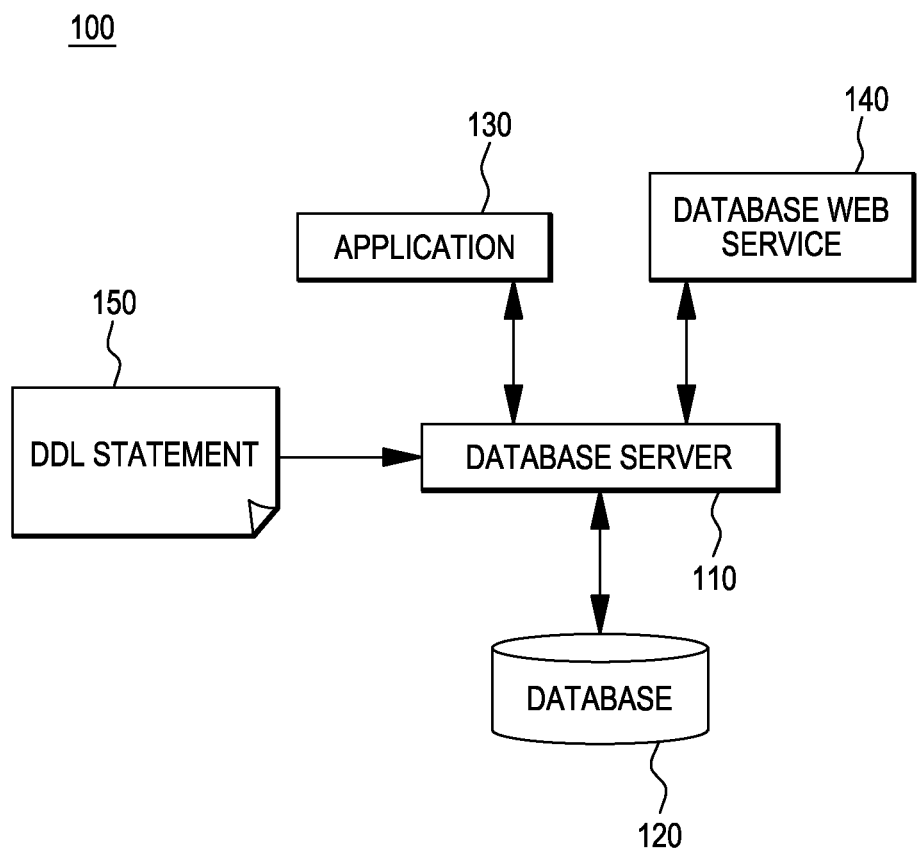
FIG. 1 symbolically shows an exemplary block diagram illustrating dependencies between a database server and a set of applications and web services, according to one embodiment of the disclosed technology.

FIG. 1 symbolically shows an exemplary block diagram illustrating dependencies between a database server and a set of applications and web services, according to one embodiment of the disclosed technology.

Computing environment 100 includes a software application 130 and a database web service 140. Database server 110 interfaces with software application 130 and database web service 140 in order to access a database 120. If a user executes a DDL statement 150 against database 120 via database server 110, then software application 130 or database web service 140 may be impacted by the database change caused by executing DDL statement 150.

Generally, database web service 140 may represent any program or a software component that is accessible via a software protocol, such as a web service, WSDL, REST, TCP/IP, network, (enterprise) service bus, Service Oriented Architecture, WSDL, URI, URL, RSH, RLogin or a remote procedure call. Further, database modifications may also include changes to database routines, stored procedures, user defined functions, user defined data types, constraint and database triggers. Other database components which may be modified may include artifacts generated for an object-relational mapping system such as EJB® (Enterprise Java® Beans applications), JPA (Java® Persistence Architecture), JDO (Java® Data Objects), JAX-RPC and JAX-WS (Java® Remote Procedure Calls and Java® Web Services), and the Hibernate® object/relational persistence and query service, as well as other database models, such as Entity-Relationship diagrams and UML (Unified Modeling Language) models.

Figure 2:
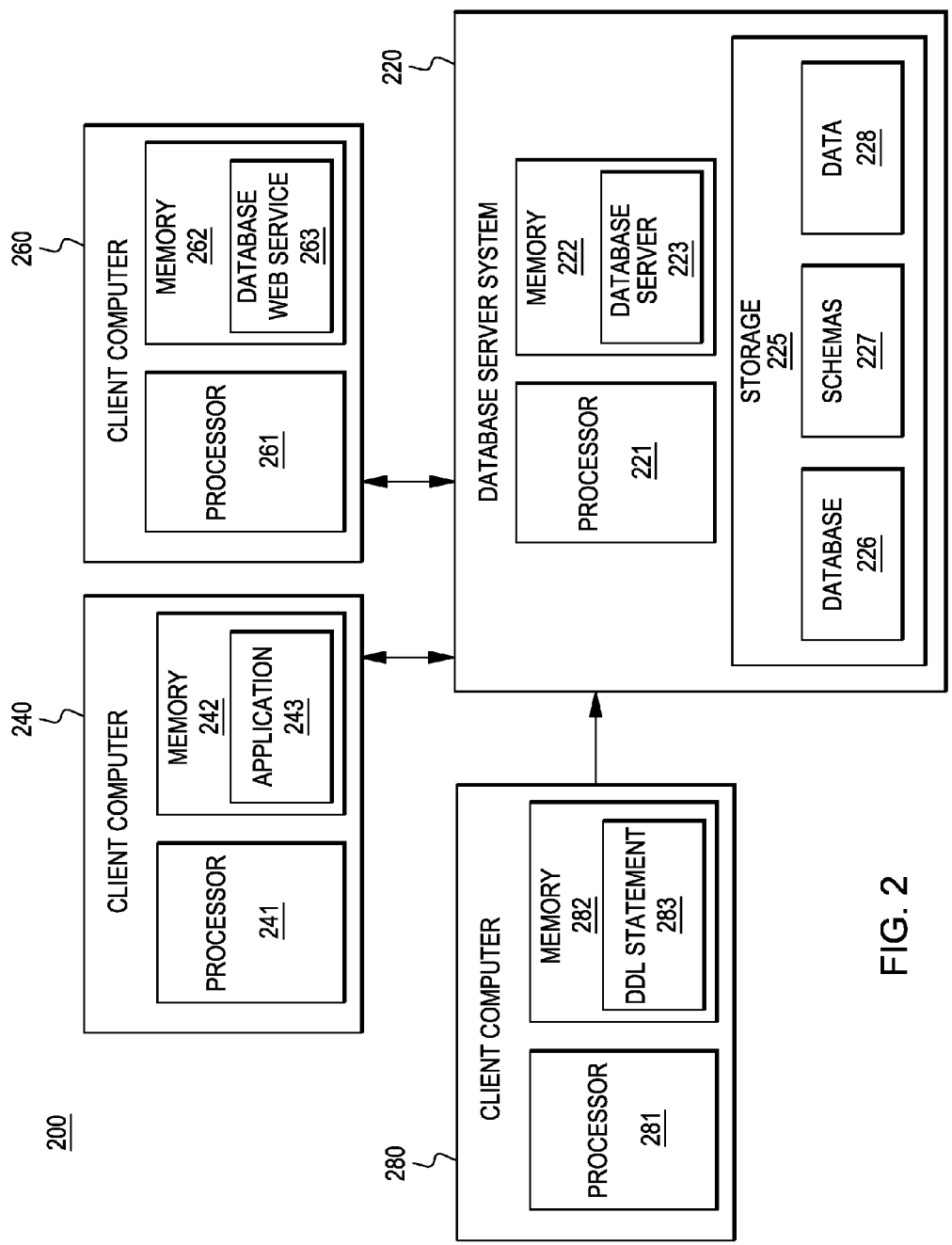
FIG. 2 symbolically shows an exemplary block diagram illustrating a hardware environment of a database server and a set of dependent applications and web services, according to one embodiment of the disclosed technology.

FIG. 2 symbolically shows an exemplary block diagram illustrating a hardware environment of a database server and a set of dependent applications and web services, according to one embodiment of the disclosed technology.

Hardware environment 200 includes client computers 240, 260, 280 and a database server system 220. In one embodiment, the computer systems illustrated in hardware environment 200 may include existing computer systems such as desktop computers, server computers, laptop computers, tablet computers, smartphones and mobile devices. Computing environment 200 as exemplarily illustrated in FIG. 2, however, is merely an example of one computing environment. Embodiments of the presently disclosed technology may be implemented using other environments, regardless of whether the computer systems are complex multi-user computing systems, such as a cluster of individual computers connected by a high-speed network, single-user workstations or network appliances lacking non-volatile storage. Further, the software applications exemplarily illustrated in FIG. 2 and described herein may be implemented using computer software applications running on existing computer systems such as desktop computers, server computers, laptop computers, tablet computers, smartphones and mobile devices. However, the software applications described herein are not limited to any currently existing computing environment or programming language and may be adapted to take advantage of new computing systems as they become available.

Database server system 220 includes a processor 221, which obtains instructions and data from memory 222 and storage 225. Processor 221 may be any processor adapted to support the methods of the disclosed technology. Memory 222 is any memory sufficiently large to hold the necessary programs and data structures. Memory 222 may be one or a combination of memory devices, such as Random Access Memory (RAM), nonvolatile or backup memory (e.g., programmable or Flash memories, Read Only Memory (ROM) and such). Furthermore, in one embodiment, memory 222 and storage 225 may be considered to include memory physically located elsewhere in a server, for example, on another computer coupled to database server 220. Database server system 220 may be operably connected to a data communications network, which may represent any kind of local and/or wide area networks, including the Internet. On database server system 220, a database server 223 operationally resides in memory 222, with its associated database 226 residing in storage 225. Illustratively, database 226 includes one or more schemas 227 and data 228. Each schema 227 defines an organizational arrangement for a corresponding set of data 228.

Client computers 240, 260, 280 each include a processor 241, 261, 281, which obtain instructions and data via a bus from a memory 242, 262, 282 and client storage. Processors 241, 261, 281 are programmable logic devices that perform all the instructions, logic and mathematical processing in client computers 240, 260, 280. Client storage stores application programs and data for use by client computers 240, 260, 280. Client storage includes hard-disk drives, flash memory devices, optical media and such. Client computers 240, 260, 280 may be operably connected to a data communication network, which may represent any kind of local and/or wide area networks, including the Internet. Client memory 242, 262, 282 includes an operating system. The operating system is the software used for managing the operation of client computers 240, 260, 280. Examples of operating systems include the UNIX® operating system, a version of the Microsoft Windows® operating system, distributions of the Linux® operating system and such.

Client computer 240 includes an application 243 in memory 242 that accesses database 226 via database server 223. Similarly, client computer 260 includes a database web service 263 in memory 262 that accesses database 226 via database server 223. Furthermore, client computer 280 includes a DDL statement 283 in memory 282 to be executed against database 226 via database server 223. However, executing DDL statement 283 against database 226 may alter database schema 227 in ways that may adversely affect application 243 and/or the database web service 263. For example, upon execution, DDL statement 283 may rename or drop a table, rename or drop a column or change the data type of a column.

Figure 3:
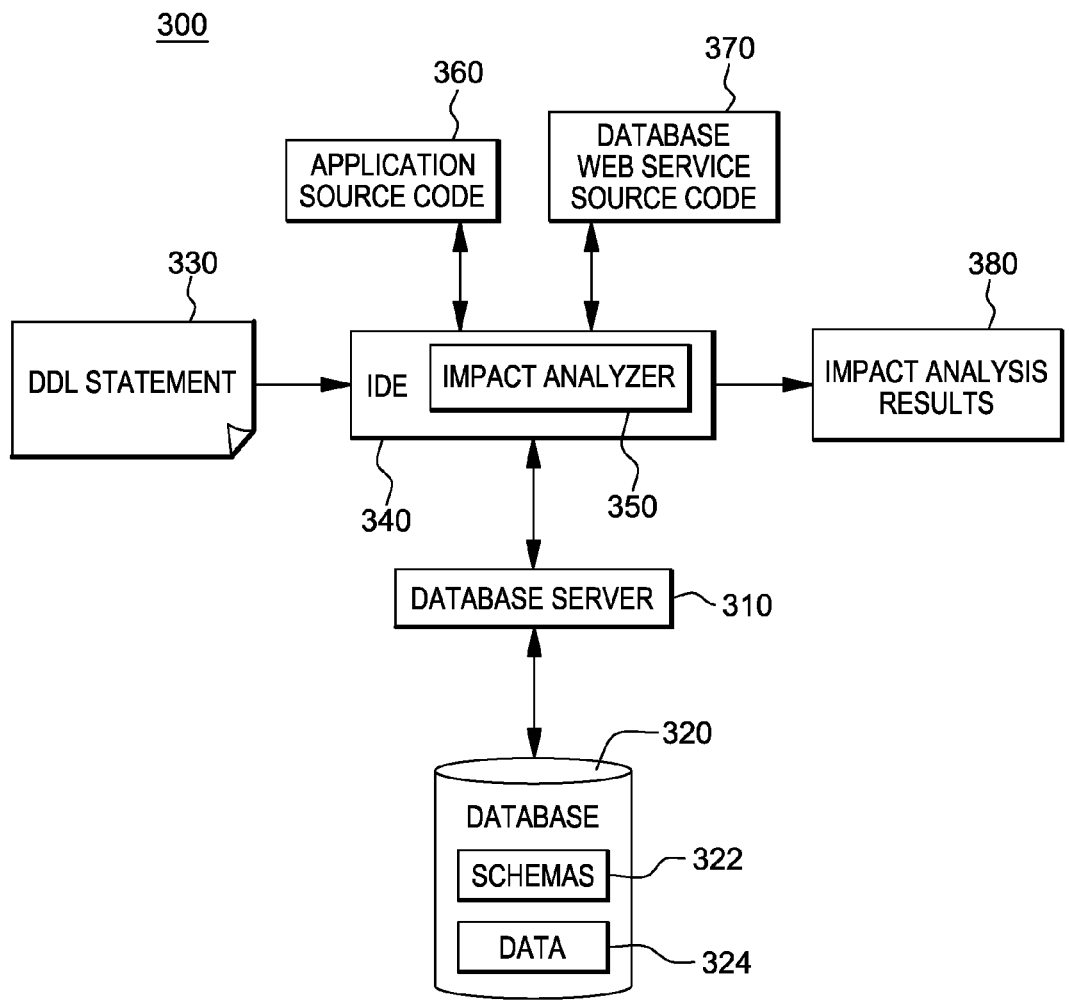
FIG. 3 symbolically shows an exemplary block diagram illustrating inputs and outputs of an impact analyzer, according to one embodiment of the disclosed technology.

FIG. 3 symbolically shows an exemplary block diagram illustrating inputs and outputs of an impact analyzer, according to one embodiment of the disclosed technology.

An impact analyzer software module 350 is operably integrated into an IDE 340 via which computer users and programmers use a program editor to write computer programs and develop software applications in the form of code, such as an application code 360 and a database web service code 370. Alternatively, code may be obtained by other techniques such as decompiling an existing application. IDE 340 is operably connected to a database server 310, which in turn is operably connected to a database 320. Illustratively, database 320 includes one or more schemas 322 and data 324. Each schema 322 defines an organizational arrangement for a corresponding set of data 324.

In one embodiment, impact analyzer software module 350 receives a DDL statement 330 and determines (without actually executing DDL statement 330) how DDL statement 330 may impact any related applications or web services. Impact analyzer software module 350 outputs the impact analysis results 380 that show, in detail, the impacted applications and database web services. Such detail may be the affected workspaces, projects and modules, or more specific, e.g., locations in code files, methods, objects, and variables. For example, impact analysis results 380 may list specific lines of application code 360 or web service code 370 that would be affected by the execution of DDL statement 330 against database 320. In one embodiment, it is possible that the execution of DDL statement 330 against database 320 may alter database schema 322 in ways that may adversely affect application compiled via application code 360 and/or the database web service compiled via database web service code 370. Analysis results 380 enable a user to ascertain the extent of the impact of the execution of DDL statement 330 on the application compiled via application code 360 and/or database web service compiled via database web service code 370.

Figure 4:
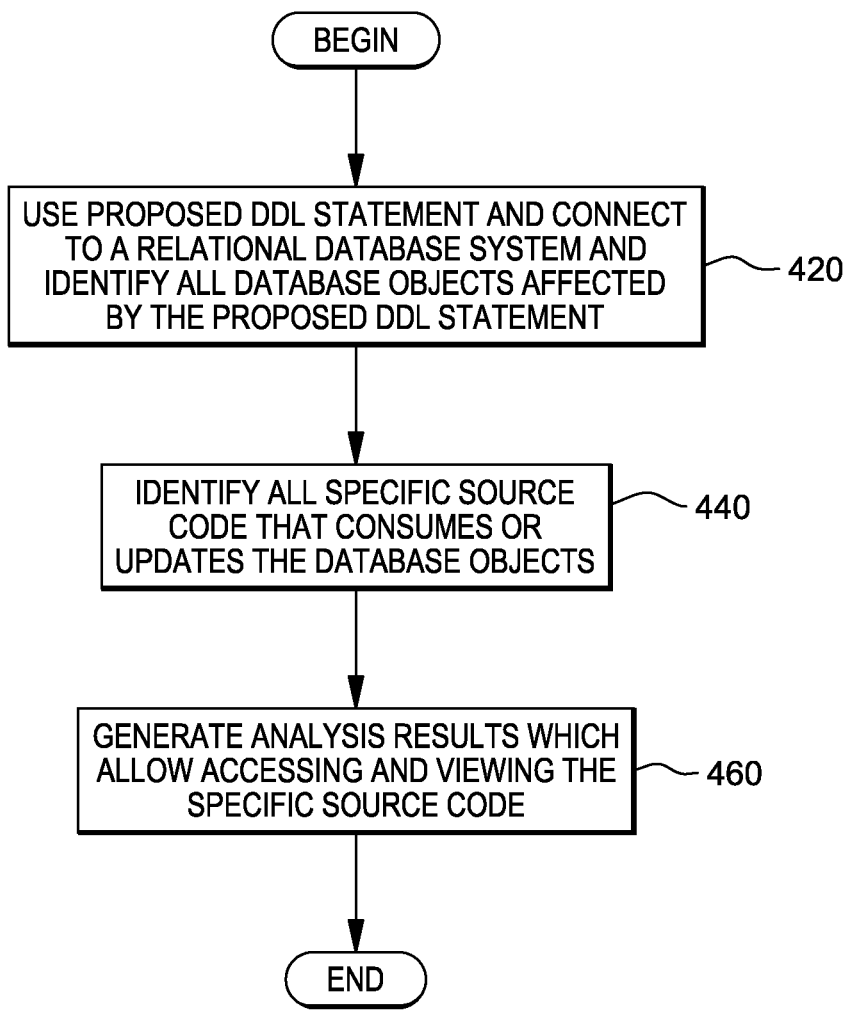
FIG. 4 symbolically shows an exemplary flow diagram broadly illustrating a method for identifying an impact of database changes on a set of applications and web services, according to one embodiment of the disclosed technology.

FIG. 4 symbolically shows an exemplary flow diagram broadly illustrating a method for identifying an impact of a proposed database schema change on a set of applications and web services, according to one embodiment of the disclosed technology.

As understood in view of FIGS. 3 and 4, method 400 begins at step 420, where a proposed DDL statement 330 is received by impact analyzer software module 350. For example, DDL statement 330 may include data for renaming a table column in database 320. Next, impact analyzer software module 350 connects to database 320 via database server 310. Once connected, impact analyzer software module 350 may request information from database 320 describing the structure or schema of database 320. Alternatively, this information may be determined from a model or other representation of database 320 state. In such case, rather than connect to the actual database or Database Management System (DBMS), impact analyzer software module 350 may access the model describing database 320. Next, impact analyzer software module 350 identifies each database object affected by proposed execution of DDL statement 330. Examples of database objects include database schemas, tables, table spaces, views, columns, constraints, privileges, primary keys, foreign keys, procedures and such. For example, impact analyzer software module 350 may identify the column renamed by DDL statement 330.

Figure 5:
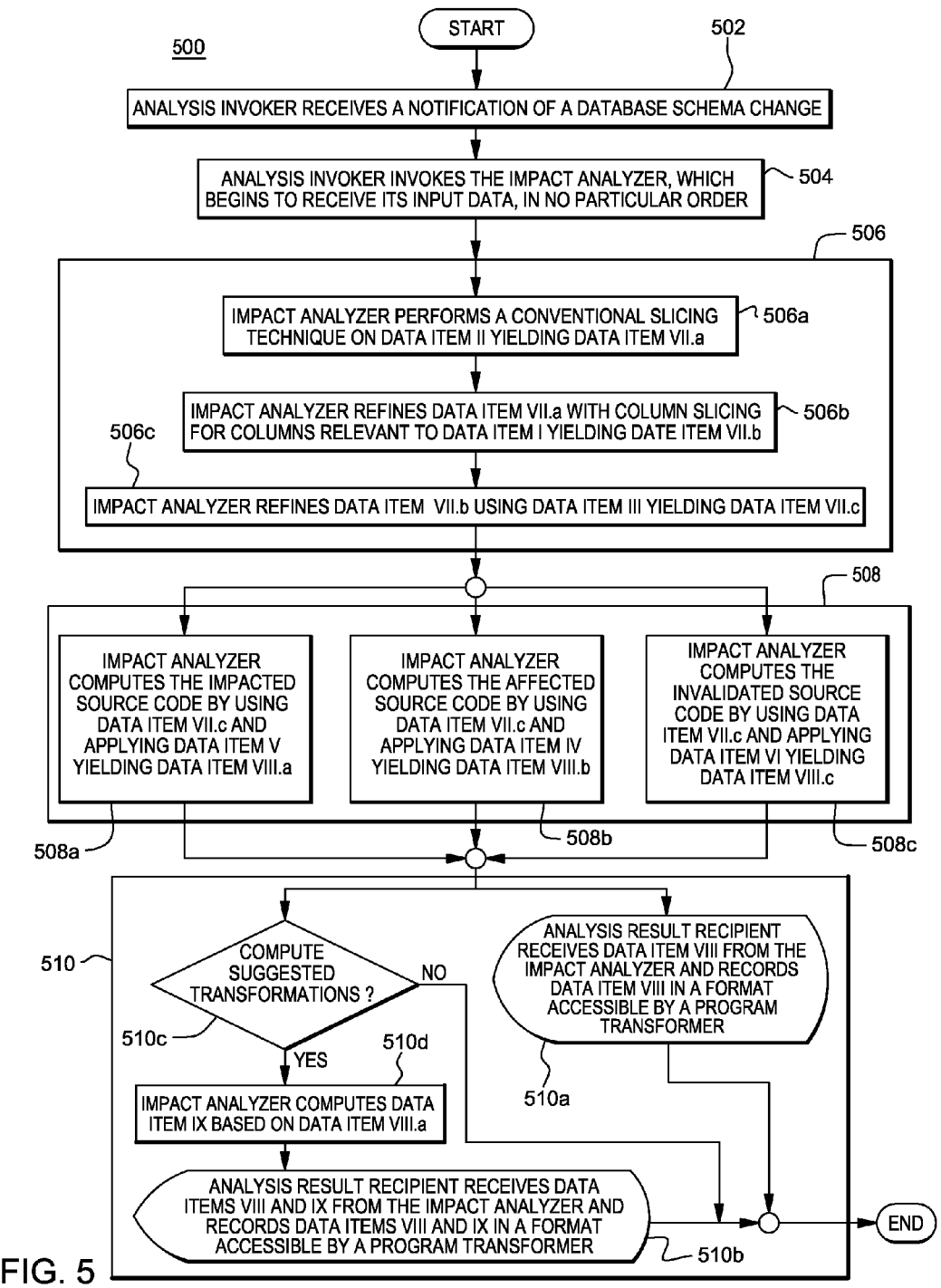
FIG. 5 symbolically shows an exemplary flow diagram illustrating a method for identifying and displaying affected code upon detecting or receiving a notification of a proposed change in a database schema, according to one embodiment of the disclosed technology.

In step 440, which is further described in the context of FIG. 5, impact analyzer software module 350 identifies some or all code related to some or all application/web service objects and methods that access database 320 objects. For example, for a Java® application, impact analyzer software module 350 identifies code that accesses database 320 column proposed to be renamed via the execution of DDL statement 330.

In step 460, which is further described in the context of FIG. 5, impact analyzer software module 350 generates analysis results 380, which allows a user to access and view the affected code, for example, in a visually distinct manner such as highlighting. Further, additional output from impact analyzer software module 350 may be generated, such as proposed actions to adapt the code and/or the query language to the change. For example, if the data type of a column is changed from a character to an integer, then that function-call in an application program may include a character (or string) variable used to store values from the column. In such a scenario, impact analyzer software module 350 may suggest a modification, for example in an IDE, to the function definition changing the character to an integer data type. Some examples of potentially viewable affected code highlighted in a visually distinct manner, proposed actions and suggested modifications are provided in the attached Appendix.

In one embodiment, in an IDE, the user may double-click on an entry in a hierarchy to access code formatted in a visually distinct manner (e.g., highlighted). Thus, a user can ascertain expected impact of proposed execution of DDL statement 330 on the performance of a software application executed via compilation and running of application code 360 and/or database web service executed via compilation and running of database web service code 370 by viewing analysis results 380. In one embodiment, impact analyzer software module 350 may support an edit mode, wherein a user can read and modify the affected code and a read-only mode, wherein a user can read, but not modify the affected code. Furthermore, impact analyzer software module 350 may be a standalone tool or part of an IDE, such as Eclipse® IDE.

In one embodiment, the hierarchy may be displayed as a tree widget in a user interface. In such a scenario, the tree may include nodes representing code files. The nodes in the tree can display the names of the code files and can be expanded to show (or collapsed to hide) references to affected code (for example, line numbers).

In one embodiment, once the user selects a reference using an input device, such as a mouse, impact analyzer software module 350 may display the associated code file in a new user interface window. In addition, in one embodiment, impact analyzer software module 350 can scroll to the referenced location of the code file, move the cursor to the referenced object or method, and format the appropriate code in a visually distinct manner such as highlighting, underlining and bolding.

FIG. 5 symbolically shows an exemplary flow diagram illustrating a method for identifying and displaying affected code upon detecting or receiving a notification of a proposed change in a database schema, according to one embodiment of the disclosed technology.

Generally, it is not necessary that IDE functionality is used for or tied to impact analyzer functions i.e. impact analysis functionality is independent of the functionality of the IDE. In one embodiment, user interaction with a GUI of the IDE is used to trigger the impact analyzer module. In one embodiment, GUI is a console, which is used for typing in a DDL statement and impact analysis module is triggered by typing the DDL statement into the console. A monitoring program may check whether the DDL statement is one which should prompt the invocation (triggering) of impact analysis module's functionality.

In one embodiment, impact analysis module is triggered in an IDE, where a "smart" SQL editor may be extended with a monitoring program. After the user performs a save operation in an editing session, the monitoring program may check whether the edits made during the session include any which should prompt the invocation (triggering) of impact analysis module's functionality.

In one embodiment, impact analysis is triggered in an IDE similar as described above, except that the user, perhaps thru a menu, is able to invoke the impact analysis module's functionality when he wants from within the editor.

For an example of the software code on which impact analyzer may perform on, see Item 8 on page 15 of the Appendix.

Method 500 begins at step 502, where an analysis invoker receives a notification of a database schema change. The analysis invoker is someone, such as a user, and/or something, such as a software program, that invokes the impact analyzer module and/or a database schema editor tool. In one embodiment, this notification is triggered upon a change to a database schema by a database schema changer, which is someone, such as a user or a DBA, and/or something, such as a software program, that makes a change to the database schema.

In step 504, the analysis invoker invokes the impact analyzer module, which begins to receive its input data, in no particular order, comprising Data item I, Data item II, Data item III, Data item IV, Data item V and Data item VI. In one embodiment, at least one component of the input data may be stored in at least one computer memory in at least one computing device. In one embodiment, all components are stored in one computer memory in one computing device.

As an example, Data item I is a database schema change representation, which, for example, may include a change to one or more database table columns. Data item I is specified in a DDL statement. For some examples of DDL statements that specify example database schema changes, see Item 2 on pages 2 to 9 of the Appendix. Example 1, as disclosed on page 2 in reference to Item 2 of the Appendix, illustrates an alteration of a data type of a column from a "Char" data type to an "Integer" data type. Example 2, as disclosed on pages 3 through 6 in reference to Item 2 of the Appendix, illustrates an addition of a column of a table that is related to an already existing column. Example 3, as disclosed on pages 7 through 9 in reference to Item 2 of the Appendix, illustrates a deletion of a column.

As an example, Data item II is a statement from the application code, which may include an Application Programming Interface (API) call that accesses the database. For example, this code may be written in Java® or C/C++.

As an example, Data item III is a list which includes at least one API property of the code programming language, which is mentioned in reference to Data item II. The content of Data item III is generated by a database schema changer. For example, at least one API property of the code programming language may be associated with one Java Database Connectivity (JDBC) SQL API method. More information on Data item III is described in report titled "Semi-Automatic J2EE Transaction Configuration" by Stephen J. Fink and Julian Dolby, IBM Research Report RC23326, 2004, the entire contents and disclosure of which, are expressly incorporated by reference herein as if fully set forth herein.

As an example, Data item IV is a list which includes at least one analysis rule for identifying affected code. The analysis rule for identifying affected code is API specific, written by a DBA and is placed in a database table. In one embodiment, the analysis rule in the table is translated to a more formal specification that is suitable for input to the impact analyzer module. Affected code is code that might produce a different result due to the alteration of a database schema. Data item IV may be placed in the database table in the same manner as Data items V and VI. In one embodiment, Data item IV may refer to "invariant" software code, which is determined by invariance rules.

As used throughout the disclosure, invariant software code is code that behaves the same—i.e. produces the same output—prior to and following a modification of a database schema. In one embodiment, this property is used with respect to program expressions and statements.

As used throughout the disclosure, an invariance rule for an API states that invoking a particular method of that API with an input argument of one type returns the same result as invoking that same method on the input argument after it has been converted to a second type. In one embodiment, an invariance rule is an example of an invariance property.

As an example, Data item V is a list which includes at least one analysis rule for identifying impacted code. The analysis rule for identifying impacted code is API specific, written by a DBA and is placed in a database table. The analysis rule in the table should be translated to a more formal specification that is suitable for input to the impact analyzer. Impacted code is code that will need to be transformed in order to synchronize it with the altered database schema. For some examples, see Item 1 on page 1 of the Appendix.

As an example, Data item VI is a list which includes at least one analysis rule for identifying invalidated code. The analysis rule for identifying invalidated code is API specific, written by a DBA and is placed in a database table. The analysis rule in the table should be translated to a more formal specification that is suitable for input to the impact analyzer. Invalidated code is code that is impacted by the database schema change and unless modified, the invalidated code will produce a runtime error. For example, if a new column is added and the code includes an "INSERT INTO SQL" statement without including column names, the impact analysis module, as described in this disclosure, will recognize the code containing the insert operation as invalidated. The invalidated code is a subset of both the impacted and the affected code. The affected and impacted code can intersect, and either can include statements that do not belong to the other. For example, for the impacted code, a tool based on impact analyzer will display a recommended transformation to the user, while for the invalidated code the same tool will display a transformation that will make the code valid. For some examples, see Item 1 on page 1 of the Appendix.

In step 506, the impact analyzer performs precise slicing process which occurs in three sub-steps in a specific order. An example of a slicing technique is described in Tip, Frank., "A Survey of Program Slicing Techniques, Journal of Programming Languages 3(3)", (1995), 121-189, the entire contents and disclosure of which, are expressly incorporated by reference herein as if fully set forth herein.

As an example, Data item VII broadly describes slicing results for the application, which provide a way of identifying a subset of Data II. Data item VII comprises Data item VII.a, Data item VII.b and Data item VII.c.

As an example, Data item VII.a is a list which includes at least one conventional slicing result, which refers to at least one an application code statement and/or expression. In one embodiment, this code may be the crude result of the application of the conventional slicing technique.

As an example, Data item VII.b includes a list of at least one column slicing result, which refers to at least one application code statement and/or expression selected from Data item VII.a that access columns relevant to Data item I. In one embodiment, this code may be a more refined result than Data item VII.a.

As an example, Data item VII.c includes a list of at least one "API-aware" column slicing result, which refers to at least one application code statement and/or expression selected from Data item VII.b that performs operations relevant to Data I, according to Data III. In one embodiment, this code may be even more refined result than Data item VII.b.

Accordingly, in step 506a, the first sub-step of step 506, the impact analyzer performs a conventional slicing technique on Data item II yielding Data item VII.a.

In step 506b, the second sub-step of step 506, the impact analyzer module refines (data items are removed from the slice) Data item VII.a (output of the first sub-step) with slicing, for example column slicing for columns relevant to Data item I yielding Data item VII.b. For some examples of an unrefined slice, see Item 3 on page 10 of the Appendix. For some examples of column slicing refinement, see Item 4 on page 11 of the Appendix.

The performance of step 506 concludes after the performance of step 506c, the third sub-step of step 506, where the impact analyzer refines Data item VII.b (output of the second sub-step) using Data item III yielding Data item VII.c.

Step 508 includes three sub-steps, which can be performed in any order.

As an example, Data item VIII broadly describes impact analysis results for a particular software application and provides a way of identifying a subset of Data item II. The output of the performance of all sub-steps of step 508 together constitutes Data item VIII, which comprises Data item VIII.a, Data item VIII.b and Data item VIII.c.

As an example, Data item VIII.a is an identification of the impacted code in a particular software application i.e. an identification of a set of impacted code statements. For example, a description of the impacted code identifies the impacted code (statements and expressions) in some manner. In one embodiment, the identification of the impacted code can be displayed thru highlighting or a simple listing of the identified statements and expressions.

As an example, Data item VIII.b is an identification of the affected code in a particular software application i.e. an identification of a set of affected code statements. For example, a description of the affected code identifies the affected code (statements and expressions) in some manner. In one embodiment, the identification of the affected code can be displayed thru highlighting or a simple listing of the identified statements and expressions.

As an example, Data item VIII.c is an identification of the invalidated code in a particular software application i.e. an identification of a set of invalidated code statements. For example, a description of the invalidated code identifies the invalidated code (statements and expressions) in some manner. In one embodiment, the identification of the invalidated code can be displayed thru highlighting or a simple listing of the identified statements and expressions.

In one sub-step of step 508, the impact analyzer module computes the impacted code by using Data item VII.c and applying it to Data item V yielding Data item VIII.a. For some examples of computing impacted code, see Item 1 on page 1, Item 2 on pages 2 to 9 and Item 5 on page 12 of the Appendix.

In another sub-step of 508, the impact analyzer module computes the affected code by using Data item VII.c and applying Data item IV to it yielding Data item VIII.b. For some examples of computing affected code, see Item 2 on pages 2 to 9 and Item 7 on page 14.

In yet another sub-step of 508, the impact analyzer module computes the invalidated code by using Data item VII.c and applying Data item VI to it yielding Data item VIII.c.

Step 510 includes sub-step 510A and an optionally performed sub-step 510B.

As an example, Data item IX is a list which includes at least one suggested program transformation for a particular software application. For some examples of suggested transformations to code, see Item 1 on page 1, Item 2 on pages 2 to 9 and Item 6 on page 13 of the Appendix.

In sub-step 510A, an analysis result recipient, such as a User Interface (UI) tool, receives Data item VIII, comprising Data items VIII.a, VIII.b and VIII.c, and, optionally, Data item IX, from the impact analyzer. Next, the analysis result recipient records Data item VIII, comprising Data items VIII.a, VIII.b and VIII.c, and, optionally, Data item IX in a format accessible by a program transformer. Program transformer is someone, such as a user, and/or something, such as a software program, that changes the software application to accommodate a change to a database schema.

In order to perform optional step 510B, a determination 510C is made as to whether it is desirable to compute Data item IX. If not, then the performance of method 500 ends.

Otherwise, the impact analyzer performs step 510D by computing Data item IX based on Data item VIII.a.

Next, an analysis result recipient, such as a UI tool, receives Data item VIII, comprising Data items VIII.a, VIII.b and VIII.c, and, optionally, Data item IX, from the impact analyzer. Next, the analysis result recipient records Data item VIII, comprising Data items VIII.a, VIII.b and VIII.c, and, optionally, Data item IX in a format accessible by a program transformer. Upon completion of the recordation in the format accessible by the program transformer, the performance of method 500 ends.

It should be noted that the embodiments described herein are intended to be illustrative and not limiting of the disclosed technology, and other embodiments are broadly contemplated. Those skilled in the art will recognize, for example, that impact analyzer may be a standalone application and/or be integrated into an IDE, database administration application and/or data modeling tool. Furthermore, the proposed database change may be in the form of a SQL DDL statement or be specified via a query builder interface. Moreover, software application may be written in any programming language that has database access capability (via libraries, extensions, modules, packages and such), such as Java® or C/C++ programming languages. In addition, the hierarchy discussed above can be further organized by variable and method names; the affected code can be from a specified workspace, project, application, or database web service; and the database object that is the target of the proposed database change may be a database, schema, table, table space, view, column, constraint, privilege, primary key, foreign key, procedure and such.

Figure 6:
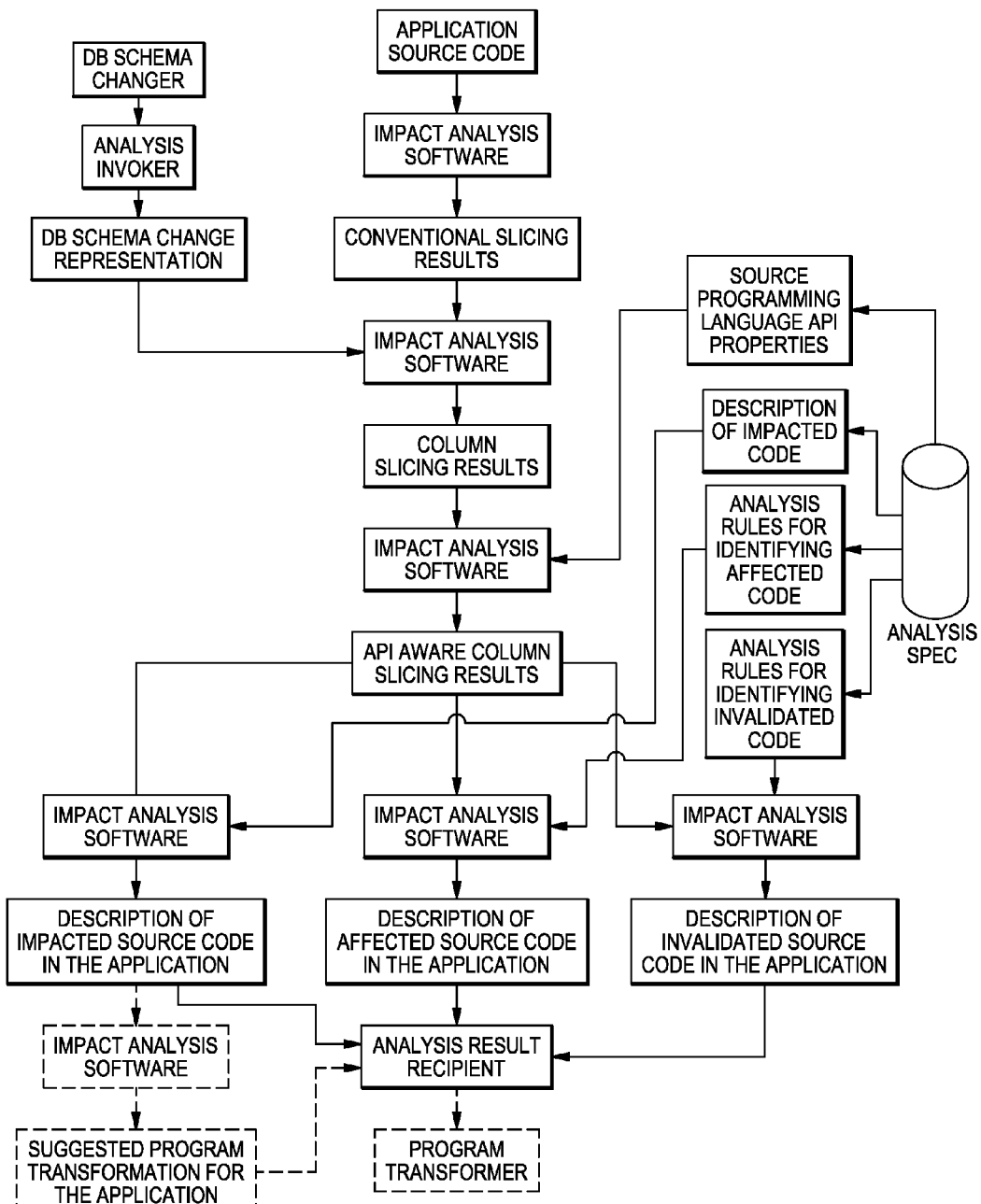
FIG. 6 symbolically shows an exemplary diagram of relationships between steps, data and participants as described in reference to FIG. 5.

FIG. 6 symbolically shows an exemplary diagram of relationships between steps, data and participants as described in reference to FIG. 5.

FIG. 7 symbolically shows examples of a table definition and DDL statements for changing a column of a database table, according to one embodiment of the disclosed technology.

A table definition 710 and a DDL statement 720 are examples of SQL code 700.

Illustratively, table definition 710 creates a table "ACT" with three fields: "ACTNO" of type SMALLINT, "ACTKWD" of type CHAR(6), and "ACTDESC" of type VARCHAR(20). Illustratively, DDL statement 720 changes the ACTNO column from type SMALLINT to type VARCHAR (5). Thus, currently, table definition 710 includes three columns, two storing text characters and one storing numeric values.

FIG. 8 symbolically shows an exemplary GUI of an IDE that displays impact analysis results for a DDL statement, highlighting variables and methods of a Java® application that accesses an affected column of a database table, according to one embodiment of the disclosed technology.

In a GUI 800, impact analysis results (see for example item 380 in FIG. 3) from a possible execution of a DDL statement (see for example item 720 in FIG. 7) also display a hierarchy of affected code locations 820, wherein the hierarchy of affected code locations 820 is seamlessly integrated into an IDE (see for example item 340 in FIG. 3). This seamless integration allows the user to access a particular affected code via the display of the hierarchy of affected code locations 820. Further, impact analysis results (see for example item 380 in FIG. 3) also allow for providing in a visually distinct manner (e.g. highlight and such) variables and methods 810 that access the affected column of a table "ACT" in a database (see for example item 320 in FIG. 3).

FIG. 9 symbolically shows another exemplary GUI of an IDE that displays impact analysis results for a DDL statement, highlighting objects and locations of a Java® application that accesses an affected column of a database table, according to one embodiment of the disclosed technology.

In a GUI 900, impact analysis results (see for example item 380 in FIG. 3) from a possible execution of a DDL statement (see for example item 720 in FIG. 7) also display a hierarchy of affected objects and their code locations 920, wherein the hierarchy 920 is seamlessly integrated into an IDE (see for example item 340 in FIG. 3). This seamless integration allows the user to access particular code locations via the hierarchy of affected objects and their code locations 920. Further, impact analysis results (see for example item 380 in FIG. 3) also allow for providing in a visually distinct manner (e.g. highlight and such) objects and locations 910 that access the affected column of a table "ACT" in database (see for example item 320 in FIG. 3).

Figure 10:
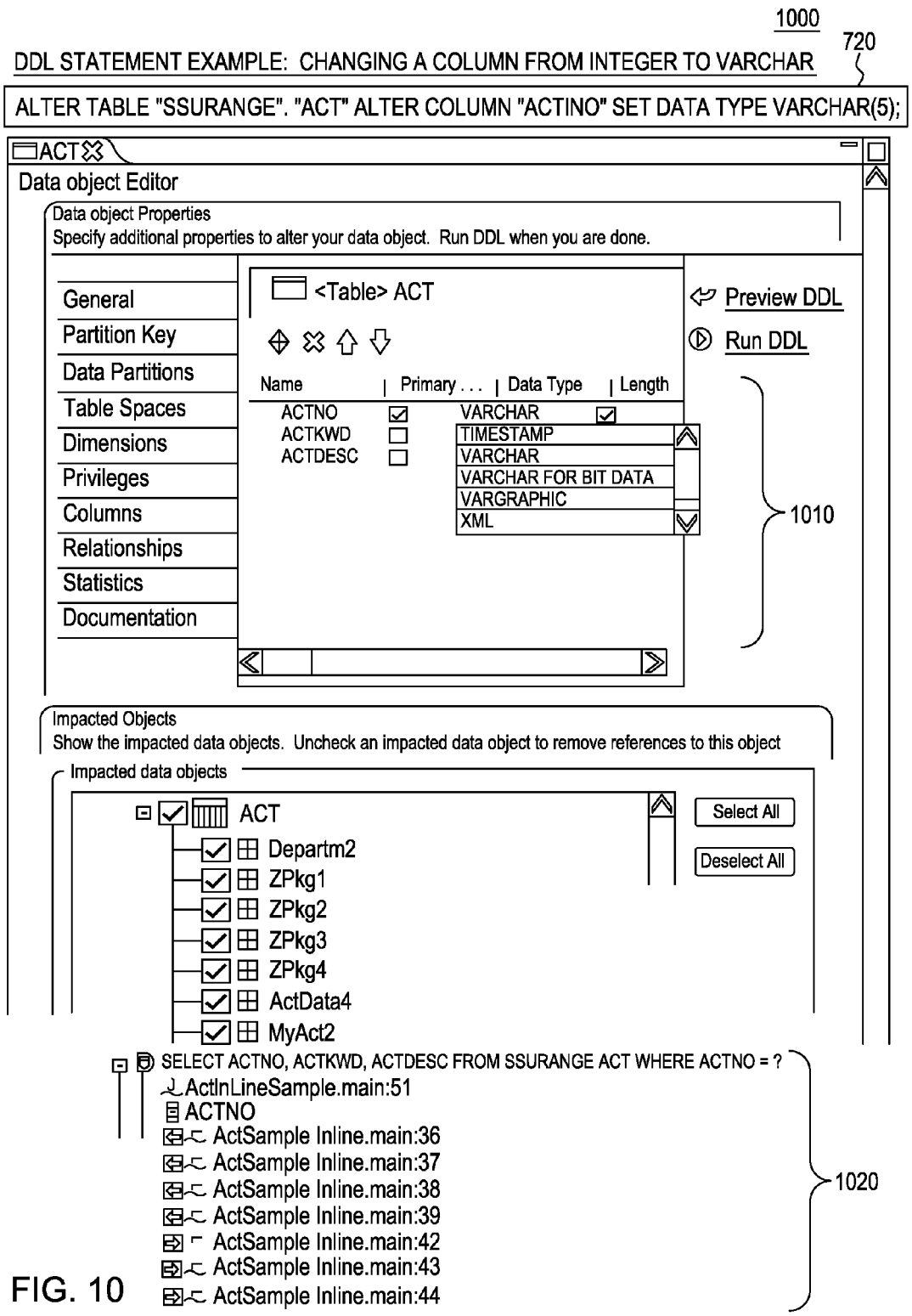
FIG. 10 symbolically shows an exemplary GUI of a DDL query builder, displaying impact analysis results for a proposed column change in a database table, according to one embodiment of the disclosed technology.

FIG. 10 symbolically shows an exemplary GUI of a DDL query builder, displaying impact analysis results for a proposed column change in a database table, according to one embodiment of the disclosed technology.

GUI 1000 includes a DDL query builder window 1010 of a database administration application, displaying impact analysis results (see for example item 380 in FIG. 3) for changing the ACTNO column type of table "ACT" in database (see for example item 320 in FIG. 3) from SMALLINT to VARCHAR via a possible execution of a DDL statement (see for example item 720 in FIG. 7). Impact analysis results (see for example item 380 in FIG. 3) also display a hierarchy of affected objects and their code locations 1020, wherein the hierarchy 1020 is seamlessly integrated into an IDE (see for example item 340 in FIG. 3). This seamless integration allows the user to access particular code locations via the hierarchy of affected code locations 1020.

Figure 11:
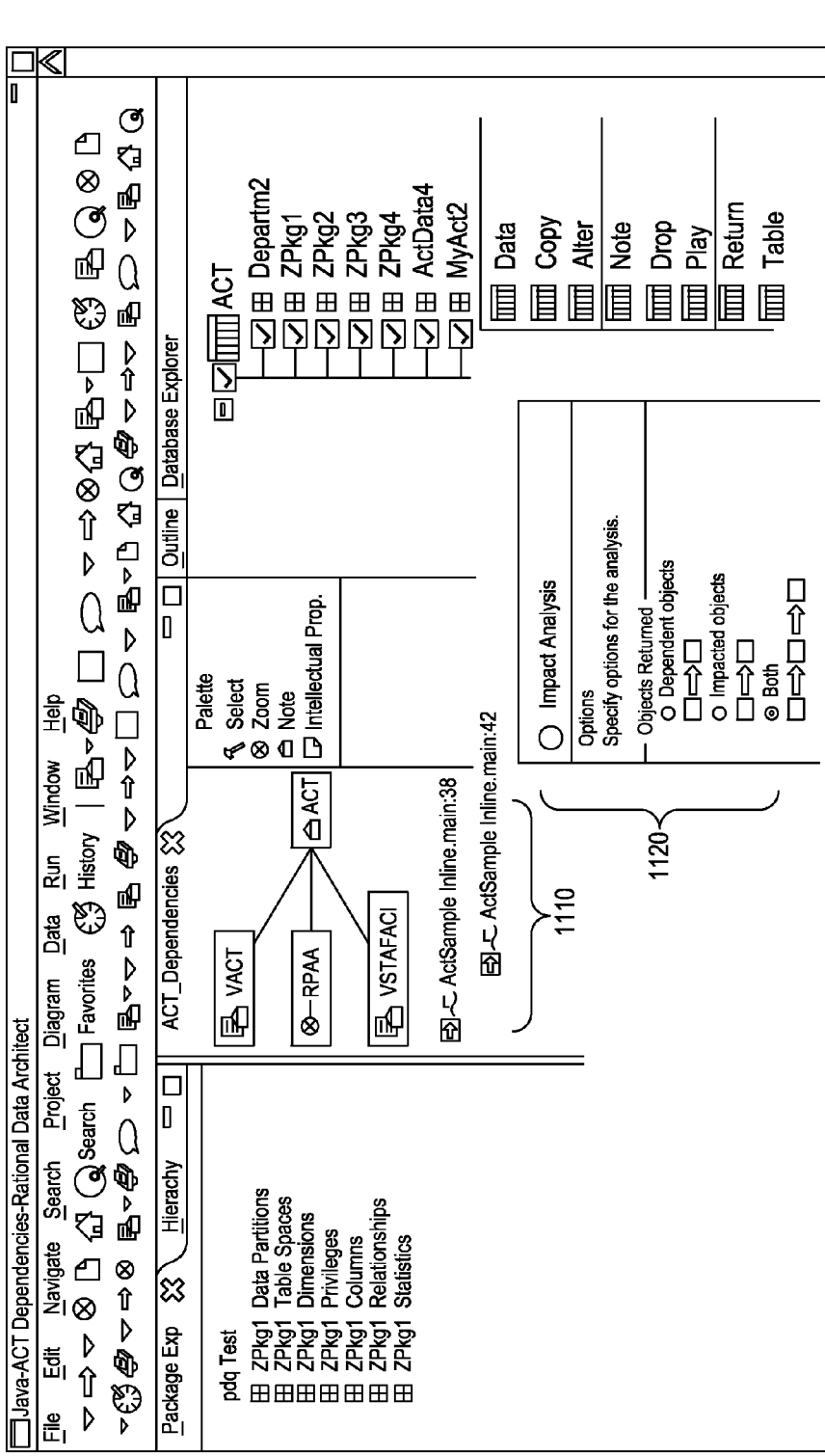
FIG. 11 symbolically shows an exemplary GUI of a data modeling tool displaying impact analysis results for a proposed column change in a database table, according to one embodiment of the disclosed technology.

FIG. 11 symbolically shows an exemplary GUI of a data modeling tool displaying impact analysis results for a proposed column change in a database table, according to one embodiment of the disclosed technology.

GUI 1100 is a GUI of a data modeling tool displaying impact analysis results (see for example item 380 in FIG. 3) for changing the ACTNO column type from SMALLINT to VARCHAR. Impact analysis results (see for example item 380 in FIG. 3) display affected database objects, Java® applications and database services 1110. Affected database objects may include tables, columns, column definitions and such. Furthermore, affected database objects may also include components of an object-relational mapping system, such as EJB (Enterprise Java® Beans), JPA (Java® Persistence Architecture), JDO (Java® Data Objects), JAX-RPC and JAX-WS (Java® Remote Procedure Calls and Java® Web Services) and Hibernate, as well as database models such as Entity-Relationship diagrams and UML (Unified Modeling Language) models. For Java® applications and database web services, impact analysis results (see for example item 380 in FIG. 3) may include references to Java® code and line numbers thereof to provide a clearer view of the impact of a column change from a possible execution of a DDL statement (see for example item 720 in FIG. 7).

Item 1120 designates a mechanism in GUI 1100 where a user can indicate whether affected, impacted or both kinds of statements of code are to be displayed.

While the foregoing is directed to embodiments of the presently disclosed technology, other and further embodiments of the disclosed technology may be devised without departing from the basic scope thereof, and the scope thereof is determined by the claims that follow.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident, software, micro-code, etc.) or an embodiment combining software and hardware aspects that may all generally be referred to herein as a "circuit," "module" or "system."

Furthermore, aspects of the present disclosure may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of disclosed herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in FIGS. 1 to 11 illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the embodiments of the present disclosure have been described in detail, it should be understood that various changes and substitutions can be made therein without departing from spirit and scope of the disclosure as defined by the appended claims. Variations described for the present disclosure can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present disclosure.

Reference in the specification to "one embodiment" or to "an embodiment" means that a particular feature, structure, or characteristic described in connection with the embodiments is included in at least one embodiment. The appearances of the phrase "one embodiment" in various places in the specification are not necessarily all referring to the same embodiment.

The invention claimed is:

1. A computer-implemented method for assessing an impact of a database schema change on a software application that accesses a database, the method comprising:
receiving, at a processing unit associated with a computer, representation of a proposed database schema change;
analyzing code of the software application responsive to said received representation, to identify a portion of the code which accesses a database object identified as being subject of the proposed database schema change;
determining a first data set by processing the identified portion of the code using database object slicing for the database object affected by the proposed database schema change;
determining a second data set by processing the first data set using a list which includes at least one API property of the code of the software application;
applying a set of predetermined rules against the second data set in order to obtain a third data set comprising one or more statements or expressions of affected code portions that produce a different result due to database schema change, impacted code portions to be transformed in order to synchronize it with the proposed database schema change, or invalidated code portions including impacted code that unless modified will produce a runtime error, each code portion having an associated reference; and
sending the third data set to an analysis result recipient capable of allowing a user to access, via the reference, at least a portion of the third data set; computing software application code affected by the proposed database schema change by applying a predetermined affected code rule against the second data set in order to obtain a fourth data set comprising the affected software application code; sending the fourth data set to the analysis result recipient operably coupled to an IDE; and
recording, by the analysis recipient, of the third data set and the fourth data set in a format accessible by a program transformer.

2. The method of claim 1, wherein the proposed database change is in the form of a query language statement, the software application is written in an object-oriented computer programming language and the database object is one of the following: a database schema, a table, a table space, a view, a column, a constraint, a privilege, a primary key, a foreign key, a procedure.

3. The method of claim 1, further comprising:
computing a suggested software application code modification by applying a predetermined impacted code rule against the second data set in order to obtain a fourth data set comprising the suggested software application code modification;
sending the fourth data set to the analysis result recipient operably coupled to an IDE; and
recording, by the analysis recipient, of the third data set and the fourth data set in a format accessible by a program transformer.

4. The method of claim 1, wherein the code of the software application is obtained from a file on a disk, a network, a data repository, a specified workspace, a project, a software module, a database web service or an IDE operably connected to a database server operably connected to the database including a database schema and data.

5. The method of claim 1, wherein the code is source code and the source code of the software application is obtained from decompiling a pre-existing software application, a text file on a disk, a network, a data repository, a specified workspace, a project, a software module, a database web service or an IDE operably connected to a database server including a database schema and data.

6. The method of claim 1, wherein performance of the method is activated via a GUI of the analysis result recipient and a DDL statement is input into the GUI and a monitoring program operably coupled to the GUI checks whether a content of the DDL statement is one which should prompt an activation of the method.

7. The method of claim 6, wherein, after a save operation in an editing session, the monitoring program operably coupled to a DDL editor is capable of checking whether an edit made during the editing session includes content that prompts the activation of the method in an IDE, wherein the IDE supports an edit mode, wherein a user can read and modify the affected code and a read-only mode, wherein a user can read, but not modify the affected code, and the IDE is the analysis result recipient.

8. The method of claim 7, wherein the checking is triggered by a user via a menu of the DDL editor operably coupled to the IDE and wherein the analysis result recipient, once the IDE user selects the reference using an input device, displays the associated portion of the third data set in a new GUI window.

9. The method of claim 1, wherein the analysis result recipient is capable of displaying the third data set formatted to be visually distinct from other code of the software application and other code portions of the third data set.

10. The method of claim 1, wherein the analysis result recipient is capable of displaying the third data set in a hierarchical dynamic expandable tree order wherein the tree includes a node representing a code file accessible via the reference and wherein the node displays a name of the code file.

11. A computer program product for assessing an impact of a database schema change on a software application, the computer program product comprising:
a storage medium readable by a processing circuit and storing instructions for execution by the processing circuit for performing a method comprising:
receiving, at a processing unit associated with a computer, representation of a proposed database schema change;
analyzing code of the software application responsive to said received representation to identify a portion of the code which accesses a database object identified as being subject of a proposed database schema change;
determining a first data set by processing the identified portion of the code using database object slicing for the database object affected by the proposed database schema change;
determining a second data set by processing the first data set using a list which includes at least one API property of the code of the software application;
applying a set of predetermined rules against the second data set in order to obtain a third data set comprising one or more statements or expressions of affected code portions that produce a different results due to database schema change, impacted code portions that are be transformed in order to synchronize it with the proposed database schema change, or invalidated code portions including impacted code that unless modified will produce a runtime error, each code portion having a reference to be accessible by; and sending the third data set to an analysis result recipient capable of allowing a user to access, via the reference, at least a portion of the third data set; computing software application code affected by the proposed database schema change by applying a predetermined affected code rule against the second data set in order to obtain a fourth data set comprising the affected software application code; sending the fourth data set to the analysis result recipient operably coupled to an IDE; and recording, by the analysis recipient, of the third data set and the fourth data set in a format accessible by a program transformer.

12. The computer program product of claim 11, wherein the proposed database change is in the form of a query language statement, the software application is written in an object-oriented computer programming language and the database object is one of the following: a database schema, a table, a table space, a view, a column, a constraint, a privilege, a primary key, a foreign key, a procedure.

13. The computer program product of claim 11, further comprising:
    computing a suggested software application code modification by applying a predetermined impacted code rule against the second data set in order to obtain a fourth data set comprising the suggested software application code modification;
    sending the fourth data set to the analysis result recipient operably coupled to an IDE; and
    recording, by the analysis recipient, of the third data set and the fourth data set in a format accessible by a program transformer.

14. The computer program product of claim 11, wherein the code of the software application is obtained from a file on a disk, a network, a data repository, a specified workspace, a project, a software module, a database web service or an IDE operably connected to a database server operably connected to the database including a database schema and data.

15. The computer program product of claim 11, wherein performance of the method is activated via a GUI of the analysis result recipient and a DDL statement is input into the GUI and a monitoring program operably coupled to the GUI checks whether a content of the DDL statement is one which should prompt an activation of the method.

16. The computer program product of claim 15, wherein, after a save operation in an editing session, the monitoring program operably coupled to a DDL editor capable of checking whether an edit made during the editing session includes content that prompts the activation of the method in an IDE, wherein the IDE supports an edit mode, wherein a user can read and modify the affected code and a read-only mode, wherein a user can read, but not modify the affected code, and the IDE is the analysis result recipient.

17. The computer program product of claim 16, wherein the checking is triggered by a user via a menu of the DDL editor operably coupled to the IDE and wherein the analysis result recipient, once the IDE user selects the reference using an input device, displays the associated portion of the third data set in a new GUI window.

18. The computer program product of claim 11, wherein the analysis result recipient is capable of displaying the third data set formatted to be visually distinct from other code of the software application and other code portions of the third data set.

19. The computer program product of claim 11, wherein the analysis result recipient is capable of displaying the third data set in a hierarchical dynamic expandable tree order wherein the tree includes a node representing a code file accessible via the reference and wherein the node displays a name of the code file.

20. A computer system for assessing an impact of a database schema change on a software application, the system comprising:
    a memory;
    a processor in communications with the computer memory, wherein the computer system is capable of performing a method comprising:
    receiving, at a processing unit associated with a computer, representation of a proposed database schema change;
    analyzing code of the software application responsive to said received representation to identify a portion of the code which accesses a database object identified as being subject of a proposed database schema change;
    determining a first data set by processing the identified portion of the code using database object slicing for the database object affected by the proposed database schema change;
    determining a second data set by processing the first data set using a list which includes at least one API property of the code of the software application;
    applying a set of predetermined rules against the second data set in order to obtain a third data set comprising one or more statements or expressions of affected code portions that produce a different results due to database schema change, impacted code portions that are be transformed in order to synchronize it with the proposed database schema change, or invalidated code portions including impacted code that unless modified will produce a runtime error, each code portion having a reference to be accessible by; and
    sending the third data set to an analysis result recipient capable of allowing a user to access, via the reference, at least a portion of the third data set; computing a suggested software application code modification by applying a predetermined impacted code rule against the second data set in order to obtain a fourth data set comprising the suggested software application code modification;
    sending the fourth data set to the analysis result recipient operably coupled to an IDE; and recording, by the analysis recipient, of the third data set and the fourth data set in a format accessible by a program transformer and wherein the proposed database change is in the form of a query language statement, the software application is written in an object-oriented computer programming language and the database object is one of the following: a database schema, a table, a table space, a view, a column, a constraint, a privilege, a primary key, a foreign key, a procedure.

21. The computer system of claim 20, wherein the code of the software application is obtained from a file on a disk, a network, a data repository, a specified workspace, a project, a software module, a database web service or an IDE operably connected to a database server operably connected to the database including a database schema and data.

22. The computer system of claim 20, further comprising:
    computing software application code affected by the proposed database schema change by applying a predetermined affected code rule against the second data set in order to obtain a fourth data set comprising the affected software application code;
    sending the fourth data set to the analysis result recipient operably coupled to an IDE; and recording, by the analysis recipient, of the third data set and the fourth data set in a format accessible by a program transformer and wherein the analysis result recipient is capable of displaying the third data set formatted to be visually distinct from other code of the software application and other code portions of the third data set and wherein the analysis result recipient is capable of displaying the third data set in a hierarchical dynamic expandable tree order wherein the tree includes a node representing a code file accessible via the reference and wherein the node displays a name of the code file.

* * * * *